(12) United States Patent
Yokoyama

(10) Patent No.: US 11,269,570 B2
(45) Date of Patent: Mar. 8, 2022

(54) NON-TRANSITORY COMPUTER-READABLE STORAGE MEDIUM, INFORMATION PROCESSING APPARATUS, AND CONTROL METHOD THAT REGISTERS INFORMATION SO AN ITEM RELATED TO AN APPLICATION CAN BE DISPLAYED AFTER THE APPLICATION HAS TERMINATED

(71) Applicant: CANON KABUSHIKI KAISHA, Tokyo (JP)

(72) Inventor: Tatsuyuki Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 16/776,878

(22) Filed: Jan. 30, 2020

(65) Prior Publication Data

US 2020/0249886 A1    Aug. 6, 2020

(30) Foreign Application Priority Data

Jan. 31, 2019    (JP) .............................. JP2019-015985

(51) Int. Cl.
*G06F 3/12* (2006.01)
*H04N 1/00* (2006.01)

(52) U.S. Cl.
CPC ............ *G06F 3/1235* (2013.01); *G06F 3/121* (2013.01); *H04N 1/00424* (2013.01); *H04N 1/00477* (2013.01); *H04N 2201/0094* (2013.01)

(58) Field of Classification Search
CPC ...... G06F 3/1229; G06F 3/121; G06F 3/1234; G06F 3/1207; H04N 1/00477
See application file for complete search history.

(56) References Cited

U.S. PATENT DOCUMENTS

| | | | |
|---|---|---|---|
| 9,122,429 B1* | 9/2015 | Cecile ................ | H04N 1/32539 |
| 2008/0062461 A1* | 3/2008 | Shiono .................. | G06F 3/1229 |
| | | | 358/1.15 |
| 2009/0116051 A1* | 5/2009 | Kasai ................... | H04N 1/2392 |
| | | | 358/1.13 |
| 2010/0073160 A1* | 3/2010 | Gilmour ............. | G06F 3/04817 |
| | | | 340/540 |
| 2011/0149342 A1* | 6/2011 | Tsujii ..................... | G06F 3/1229 |
| | | | 358/1.15 |
| 2019/0384549 A1* | 12/2019 | Miyasaka ............. | G06F 3/1208 |

FOREIGN PATENT DOCUMENTS

JP    2002-190847 A    7/2002

* cited by examiner

*Primary Examiner* — Benjamin O Dulaney

(74) *Attorney, Agent, or Firm* — Venable LLP

(57) ABSTRACT

There is provided with a non-transitory computer-readable storage medium. The medium stores a predetermined application that displays information related to a printer and is executed by a computer which includes an operating system for displaying a display item for activating an application. The computer uses the predetermined application to determine whether predetermined information related to the printer has been obtained when the predetermined application has been activated and cause the operating system to display the display item for activating the predetermined application by registering, based on a determination that the predetermined information has been obtained, activity information related to an activity of the predetermined application in the operating system.

15 Claims, 9 Drawing Sheets

NON-TRANSITORY COMPUTER-READABLE STORAGE MEDIUM, INFORMATION PROCESSING APPARATUS, AND CONTROL METHOD THAT REGISTERS INFORMATION SO AN ITEM RELATED TO AN APPLICATION CAN BE DISPLAYED AFTER THE APPLICATION HAS TERMINATED

BACKGROUND OF THE INVENTION

Field of the Invention

The present invention relates to a non-transitory computer-readable storage medium, an information processing apparatus, and a control method.

Description of the Related Art

Conventionally, there is proposed a technique of automatically activating, in a communication terminal or the like, an application for obtaining information, via a network, based on a predetermined condition to activate the application without requiring a user to pay a particular attention to the activation (Japanese Patent Laid-Open No. 2002-190847). On the other hand, in recent years, there is an operating system (to be referred to as an OS hereinafter) that provides the following function. That is, an application can register an activity related to a work, an operation, and the like performed by the self-application in the OS. The OS displays, on a display or the like, a screen listing the activities registered by the application. Subsequently, when the user selects a displayed activity by using an input device or the like, the application that registered the selected activity is activated. By using such a function to register the activity of the application in the OS, it becomes possible for the user to easily activate the application by using a standard mechanism of the OS.

SUMMARY OF THE INVENTION

According to one embodiment of the present invention, a non-transitory computer-readable storage medium storing a predetermined application that displays information related to a printer and is executed by a computer which includes an operating system for displaying a display item for activating an application, wherein the computer uses the predetermined application to determine whether predetermined information related to the printer has been obtained when the predetermined application has been activated, and cause the operating system to display the display item for activating the predetermined application by registering, based on a determination that the predetermined information has been obtained, activity information related to an activity of the predetermined application in the operating system.

According another embodiment of the present invention, an information processing apparatus comprising: a determination unit configured to determine whether predetermined information related to a printer has been obtained when a predetermined application has been activated, and a display unit configured to cause an operating system to display a display item for activating the predetermined application by registering, based on a determination that the predetermined information has been obtained, activity information related to an activity of the predetermined application in the operating system.

According to still another embodiment of the present invention, an information processing method executed in an information processing apparatus, the method comprising: determining whether predetermined information related to a printer has been obtained when a predetermined application is activated, and causing an operating system to display a display item for activating the predetermined application by registering, based on a determination that the predetermined information has been obtained, activity information related to an activity of the predetermined application in the operating system.

Further features of the present invention will become apparent from the following description of exemplary embodiments (with reference to the attached drawings).

DESCRIPTION OF THE EMBODIMENTS

However, depending on the type and the activity contents of the application, the need for activating the application by selecting the activity may be low. For example, in the case of an application that displays status information indicating the state of a printer on a GUI (Graphical User Interface), depending on the user, he/she may feel that notification information is unnecessary unless an error/warning has occurred in the printer. Hence, in such a case, there may be a user who will feel that it is desirable for the activity of the application to not be displayed on a display or the like. On the other hand, in a case in which an error/warning has occurred in the printer, registering the activity in the OS and causing the OS to display the activity on the display or the like will allow the user to select the activity to activate the application. This will allow the user to be notified of the error/warning state of the printer. The user can subsequently make an operation to cancel the error/warning state or make an operation to make another printer execute the printing instead. Hence, in a case in which an error or a warning has occurred in the printer in this manner, there may be many users who will feel that it is desirable for the activity of the application to be displayed on a display or the like.

In consideration of the above-described problem, embodiments of the present invention provide a program that more effectively registers an activity of an application, an information processing apparatus, and a control method thereof.

Embodiments of the present invention will be described in detail with reference to the accompanying drawings hereinafter. Note that the following embodiments do not limit the scope of the appended claims, and not all combinations of features described in the embodiments are essential to the solving means of the present invention.

First Embodiment

Figure 1:
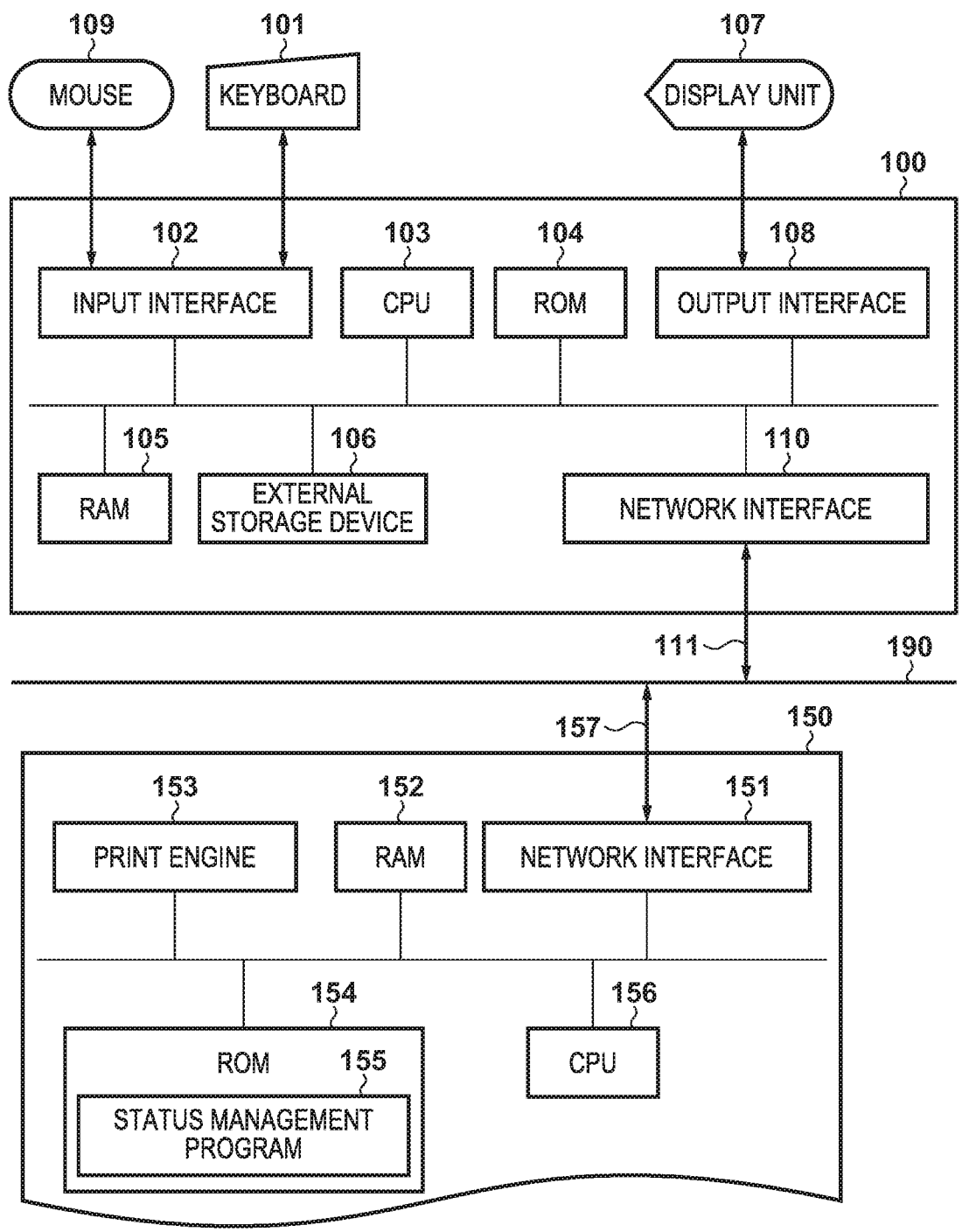
FIG. 1 is a block diagram of the hardware arrangement of a printing apparatus and an information processing apparatus according to the first embodiment.

The hardware arrangement of a printing apparatus 150 and an information processing apparatus 100 according to the first embodiment will be described with reference to FIG. 1. Note that FIG. 1 schematically shows an arrangement related to the embodiment.

The information processing apparatus 100 includes an input interface 102, a CPU 103, a ROM 104, a RAM 105, an external storage device 106, an output interface 108, and a network interface 110. The input interface 102 is connected to a keyboard 101 and a mouse 109 which serve as input devices. Also, the output interface 108 is connected to a display unit 107. The display unit 107 is, for example, a display. The network interface 110 is connected to a network 190 via a network cable 111. Note that the connection between the network interface 110 and the network 190 is not limited to wired connection via the network cable 111 and may be performed by wireless connection. The ROM 104 stores, for example, an initialization program. In addition, the external storage device 106 stores, for example, application programs, an operating system (to be referred to as an OS hereinafter), a printer driver 240, and other various kinds of data. The RAM 105 is used as a work memory when the CPU 103 executes various kinds of programs stored in the external storage device 106.

The printing apparatus 150 includes a network interface 151, a RAM 152, a print engine 153, a ROM 154, and a CPU 156. The network interface 151 is connected to the network 190 via a network cable 157. Note that the connection between the network interface 151 and the network 190 is not limited to wired connection via the network cable 157 and may be performed by wireless connection. The RAM 152 is used as the main memory and the work memory of the CPU 156 and stores various kinds of data and a reception buffer for temporarily storing a received print job. The print engine 153 performs printing based on the data stored in the RAM 152. The ROM 154 stores various kinds of control programs and data used by the control programs such as a status management program 155 and the like. The CPU 156 controls each unit of the printing apparatus 150 in accordance with these control programs. The status management program 155 is a program that monitors the state of the printing apparatus 150 based on the information of the various kinds of sensors (not shown) in the printing apparatus, generates status information, and stores the generated status information in the RAM 152. Although the allotment of processes between the information processing apparatus 100 and the printing apparatus 150 has been described in the above manner, it is not particularly limited to this allotment mode, and another mode may be used.

Figure 2:
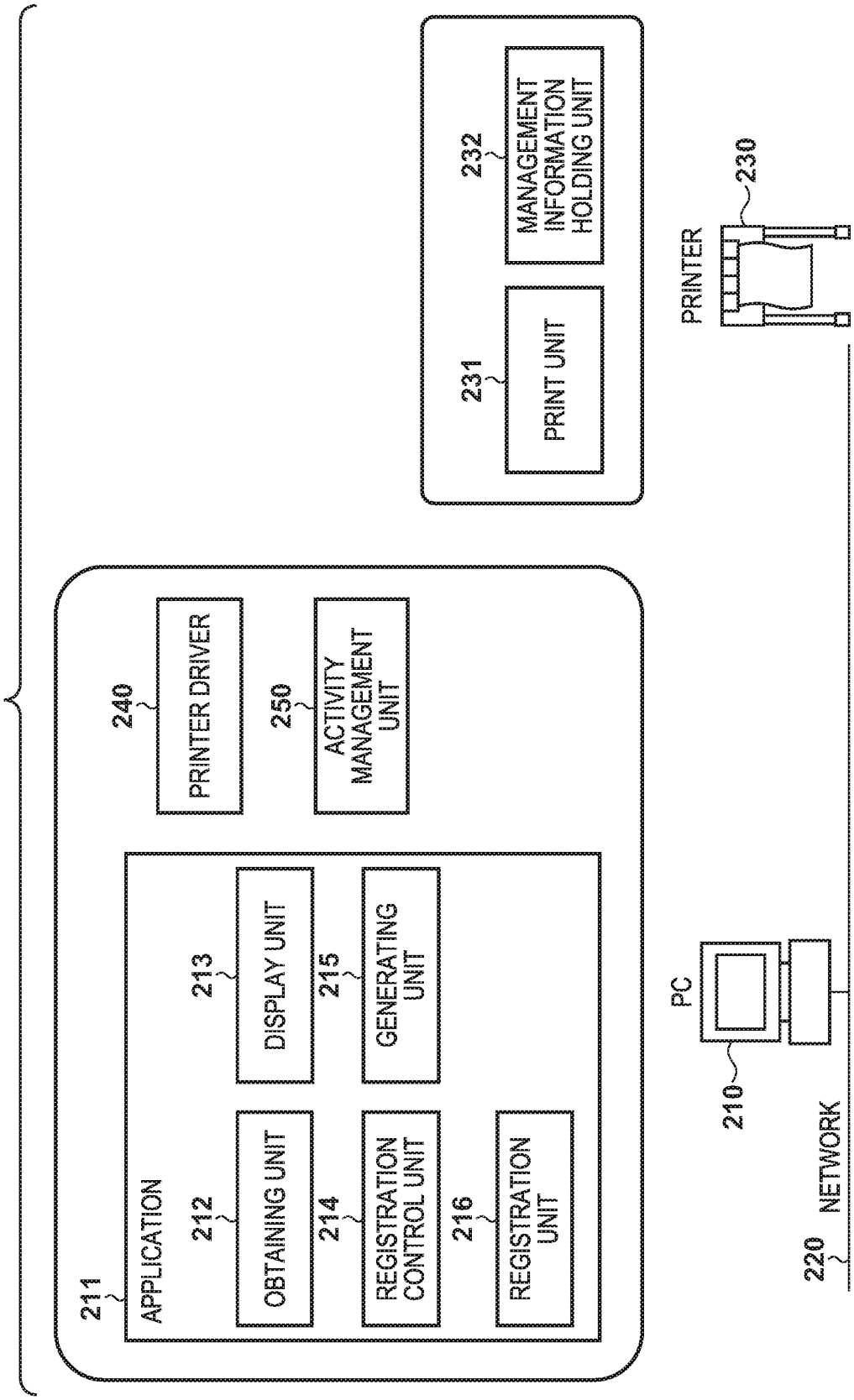
FIG. 2 is a block diagram showing an example of the system arrangement according to the first embodiment.

FIG. 2 is a block diagram showing the arrangement of a system according to this embodiment. The system according to this embodiment includes a PC 210, a network 220, and a printer 230. Note that the PC 210 has the same arrangement as the information processing apparatus 100 shown in FIG. 1, and the printer 230 has the same arrangement as the printing apparatus 150 as shown in FIG. 1.

The PC 210 uses the printer driver 240 or the like to transmit a print job to the printer 230 via the network 220. The printer 230 performs printing by a print unit 231. An application 211 is activated in the PC 210 at the transmission of the print job by the printer driver 240. Also, an activity management unit 250 provided by the OS manages the activity of each application operating in the PC 210 and displays a list of the activity of each software program on the display unit 107. An activity is information related to a work, an operation, or the like performed by an application, and the activity can be registered in the OS by the application. The activity management unit displays a screen listing the activity registered by each application. The activity also includes information that can be used by the OS to specify the application corresponding to the activity. When a user selects a displayed activity by an input device or the like, the OS activates, among the plurality of applications, the application registered in the selected activity. The details of the activity management unit 250 will be described later with reference to FIG. 5A and FIG. 5B.

Note that a representative example of activity display by the OS is the timeline function supported by Windows 10® which is the OS by Microsoft. In the timeline support function, the displaying of an activity list screen (to be referred to as timeline display hereinafter) is performed based on the activities held by the OS. In this timeline display, it is possible to confirm what kind of applications were operating in time series in a list display. In addition, since an application corresponding to an activity can be activated by clicking the activity displayed on the timeline, it is highly convenient for the user. For example, in a case in which the user wants to re-edit a document he/she has written on a document application on a previous day, the user will click the activity of the corresponding document application among the activities displayed on the timeline. As a result, the document application is activated, and the user can start editing again.

The application 211 is an application program executed by the PC 210. In this embodiment, the application 211 is an application that manages the state and information of the printer 230 and displays a GUI (Graphical User Interface) screen. For example, the application 211 is stored in the ROM 104 of the PC 210. The CPU 103 implements the following various functions of the application 211 by reading out the application 211 from the ROM 104 to the RAM 105 and executing the application. The application 211 includes an obtaining unit 212, an analyzing unit 217, a display unit 213, a registration control unit 214, a generating unit 215, and a registration unit 216.

The obtaining unit 212 obtains management information from a management information holding unit 232 of the printer 230 via the network 220. The analyzing unit 217 analyzes the management information obtained by the obtaining unit 212. For example, the analyzing unit 217 confirms the printing progression status, the remaining ink information, and whether an error or a warning has occurred in the printer. The display unit 213 updates and displays the GUI screen based on the information analyzed by the analyzing unit 217.

The registration control unit 214 controls the registration of each activity in the OS based on the management information analyzed by the analyzing unit 217. For example, the registration control unit 214 performs control to register an activity in the OS when an error/warning of which the user needs to be notified has occurred, and not to register the activity in a case in which no error/warning has occurred.

When the registration control unit 214 performs control to register an activity, the generating unit 215 generates an activity that can be registered in the OS based on the management information. The registration unit 216 registers, in the OS, the activity generated by the generating unit 215.

Note that the functional units of application 211 are merely an example. The functions of the functional units may be integrated or divided, and some of the functions of a functional unit may be executed by another functional unit. In addition, the application 211 may have a functional unit other than the functional units shown in FIG. 2.

This embodiment has an arrangement in which the PC 210 obtains information of the printer 230 via a network. However, it may be arranged so that information will be obtained by connecting the PC 210 and the printer 230 by an interface such as an USB (Universal Serial Bus), an interface in compliance with IEEE (Institute of Electrical and Electronics Engineers) 1394, or the like. Also, in this embodiment, the printer 230 is included in the system arrangement since the system has been arranged for an example in which the application 211 that displays management information of the printer 230 on the PC 210 is to be activated. However, for example, the system may be arranged by a device other than a printer such as a scanner, a FAX, a multifunction peripheral, or the like. In addition, an application that can display information related to the PC 210 without connecting a specific device to the PC 210 may be used.

In addition, although this embodiment employs a system in which the printer 230 and the PC 210 communicate one to one, it may be arranged so that the printer 230 will be connected to a plurality of PCs. In such a case, it may be arranged so that the application 211 will operate in each PC. Also, it is possible to employ an arrangement in which the application 211 operating in the PC 210 will manage a plurality of printers and other devices.

Figure 3:
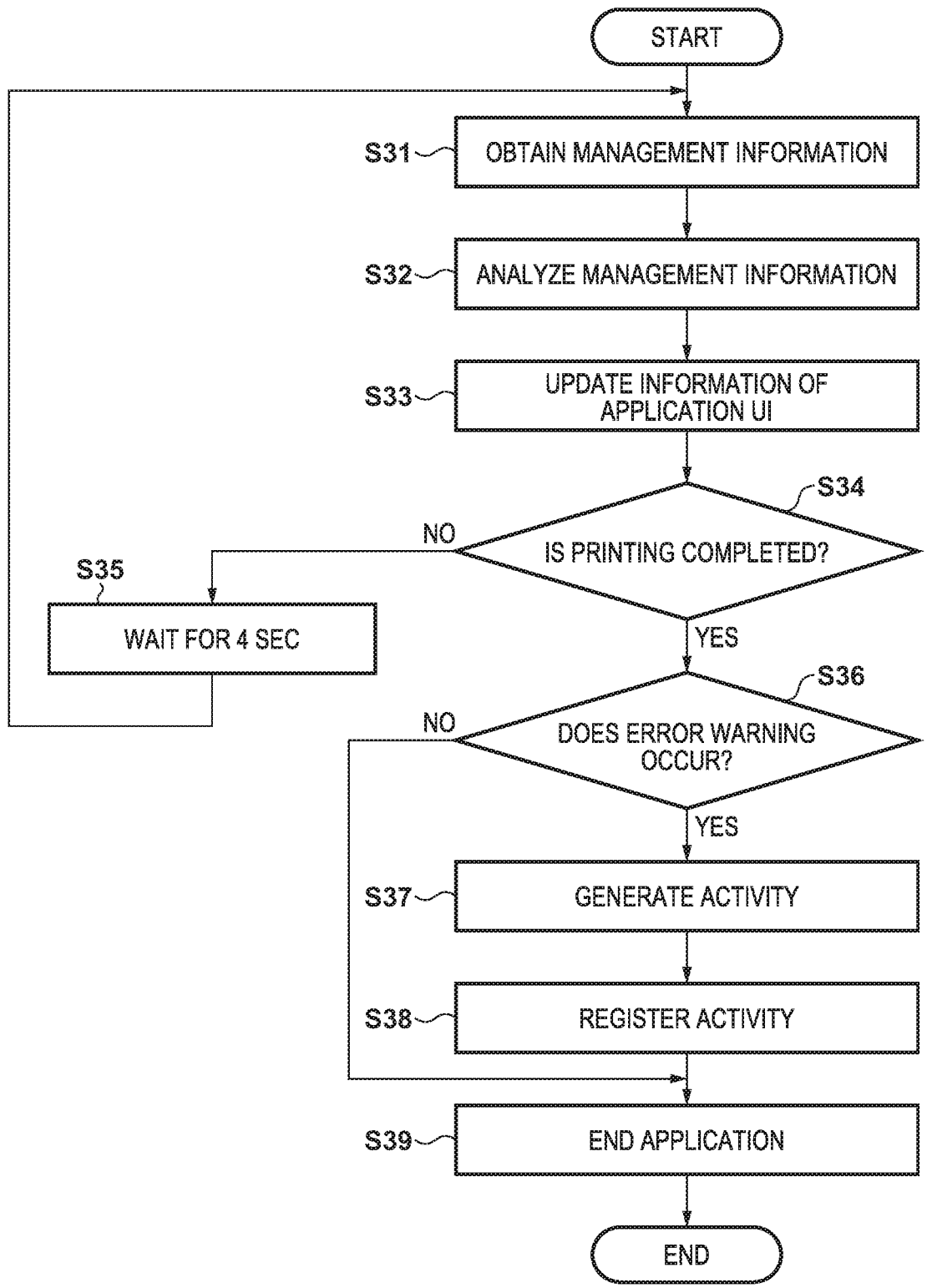
FIG. 3 is a flowchart of the processing procedure of an application activated by a printer driver at the time of printing according to the first embodiment.

FIG. 3 is a flowchart showing the processing procedure of the application 211 that has been activated by the printer driver 240 at the time of printing according to the first embodiment. This processing is performed by the CPU 103 of the PC 210 functioning as each functional unit of the application 211 shown in FIG. 2. In this embodiment, the application 211 can be activated simultaneously with the printing operation. In addition, the application 211 will automatically end when the end of the printing operation is detected.

When the application 211 has been activated, in step S31, the obtaining unit 212 communicates with the printer 230 via the network 220 and obtains the management information from the management information holding unit 232 of the printer 230. In this embodiment, the management information includes the print job progression status information, the remaining ink information, and the information of an error/warning generated in the printer, and the like.

In step S32, the analyzing unit 217 analyzes the management information obtained in step S31. Next, in step S33, the display unit 213 updates the GUI of the application 211 based on the result from the analysis of the management information performed by the analyzing unit 217 in step S32. Details of the GUI of the application 211 will be described later with reference to FIG. 4.

In step S34, the registration control unit 214 determines whether the printer 230 has completed the print job based on the management information. If it is determined that the printing has been completed, the application 211 shifts to the process of step S36. If it is determined that the printing has not been completed, the application 211 shifts to the process of step S35.

In step S35, the registration control unit 214 waits for 4 sec. Subsequently, to periodically poll the management information until the printing is completed, the application 211 shifts to the process of step S31. Subsequently, the above-described processes are repeated until the printing is completed.

In step S36, the registration control unit 214 determines, based on the obtained and analyzed management information, whether to register the activity in the OS. The registration control unit 214 will determine to register the activity if a phenomenon which the user needs to be notified of has occurred in the printer 230, and will determine not to register the activity if the phenomenon has not occurred. For example, in a case in which a "no ink" error, a "low ink" warning, a "no paper" error, or the like has occurred, the registration control unit 214 will determine that there is a phenomenon that needs to be registered in the OS because the user needs to be notified of the phenomenon. If the registration control unit 214 determines that a phenomenon which needs to be registered in the OS has occurred in the printer 230, the application 211 shifts to the process of step S37. On the other hand, if it is determined that a phenomenon which needs to be registered in the OS has not occurred in the printer 230, the application 211 shifts to the process of step S39. Although this embodiment raised the "no ink" error, the "low ink" warning, the "no paper" error, and the like as examples of a case in which user notification is necessary, these are merely examples, and the user may be notified of other kinds of errors/warnings. In addition, for example, it may be determined that activity registration will not be performed in the case of the "low ink" warning (NO in step S36), or it may be determined that activity registration will be performed in the case of the "no ink" error (YES in step S36). Furthermore, it is possible to employ an arrangement in which the user can select the error/warning of which he/she is to be notified on the GUI of the application 211.

In step S37, the generating unit 215 generates an activity of the application 211 based on the obtained and analyzed management information. An activity is information related to the work, operation, and the like performed by the application. In this embodiment, the OS is arranged to be capable of displaying a list of the activities of the respective applications in the manner of the timeline function described above. Each activity is formed to include, for example, date information, an application name, information related to an operation of an application, and the like. In this embodiment, the activity is generated in the manner of the date information: Nov. 8, 2018, the application name: App 1, the information related to the operation of the application: notification of the occurrence of a "no ink" error, and the like. For example, the OS can specify, based on the above-described application name, an application corresponding to the activity among the plurality of applications installed in the OS, and activate the application. Note that the information, included in the activity, used by the OS to specify the application is not limited to the application name and may be various kinds of information.

In step S38, the registration unit 216 registers the activity generated by the generating unit 215 in the activity management unit 250 of the OS. When the activity is registered by the application 211, the activity management unit 250 of the OS displays the registered activity. The display contents will be described in detail later with reference to FIGS. 5A and 5B. In addition, due to the registration of the activity in step S38, the OS can specify, among the plurality of applications, the application corresponding to the activity and reactivate the application.

In step S39, the application 211 ends the processing, and the process of the application 211 ends.

Figure 4:
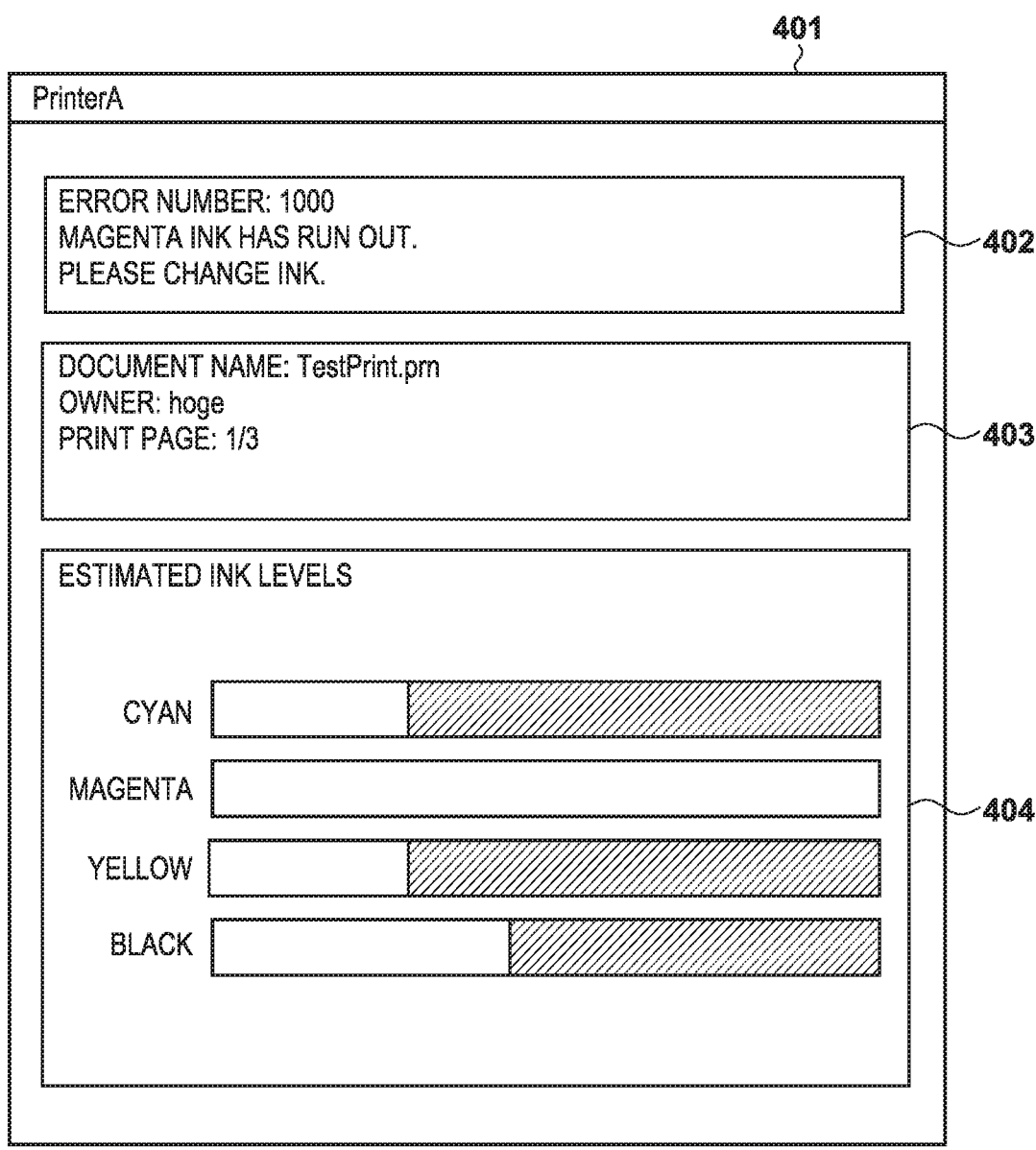
FIG. 4 is a view showing a display example of an application GUI by a display unit of a PC.

FIG. 4 shows a display example of the GUI of the application 211. The GUI of the application 211 includes a title bar 401, a message display area 402, a job information display area 403, and an ink information display area 404. The title bar 401 displays the application name, the printer name, and the like. The message display area 402 displays a message indicating the state of the printer 230 based on the result of the analysis of the management information by the analyzing unit 217. The job information display area 403 displays information related to a print job that is being executed by the printer 230 based on the result of the analysis of the management information by the analyzing unit 217. The ink information display area 404 performs display related to ink information of the printer 230 based on the result of the analysis of the management information by the analyzing unit 217. Note that the display contents are merely an example, and other pieces of information may be displayed.

Figure 5A:
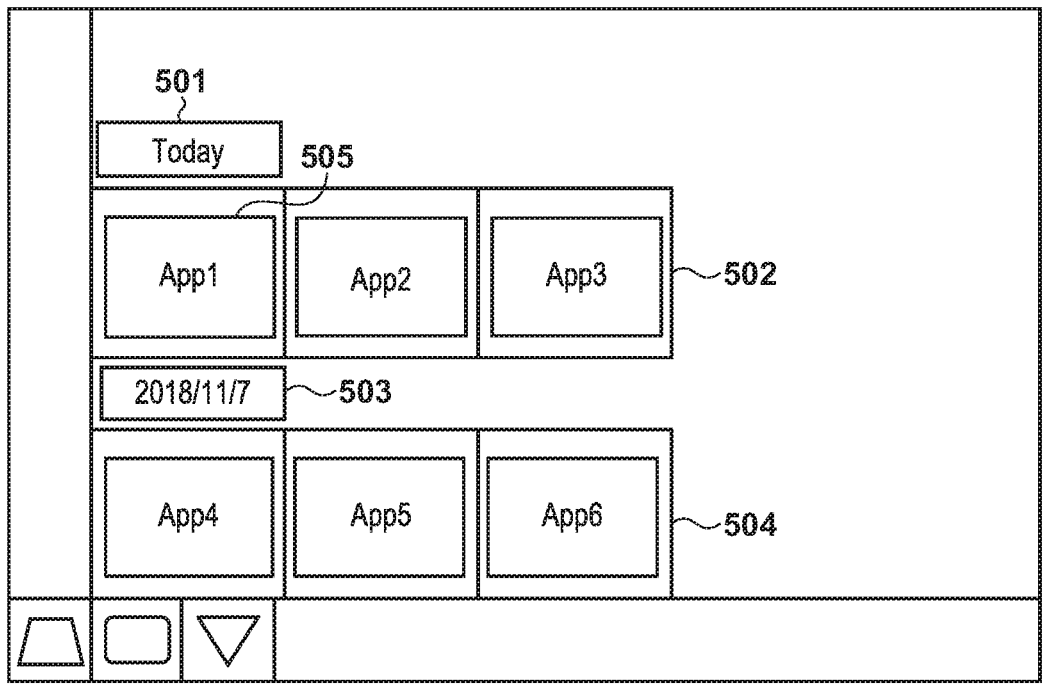
FIG. 5A is a view showing an example of an activity list displayed by an activity management unit on a desktop of an OS.

FIG. 5A shows an example in which the activity management unit 250 displays an activity list on a desktop screen of the OS. On the desktop screen, a date information display area 501 displays date information as indicated by "Today". An activity display area 502 displays the activity of each application corresponding to the date displayed in the date information display area 501. In this embodiment, since the activity of the application 211 has been registered as "name: Appl" in step S37, the activity is displayed as "Appl" in a tile 505 in the activity display area 502. As a bitmap image to be displayed on the tile 505, a bitmap image corresponding to the error/warning which occurred in the printer 230 may be displayed. Also, the application 211 corresponding to the tile 505 can be activated by clicking the tile 505 of the activity display area 502. A date information display area 503 displays the date information in the manner of "2018/11/7". An activity display area 504 displays the activity of each application corresponding to the date displayed on the date information display area 503.

Although activity updating is performed at the timing of the end of the application 211 (steps S37 and S38) in this embodiment, activity updating may be performed at the timing of the activation of the application 211 or the timing at which the information of the error/warning that has occurred in the printer 230 has been detected. Also, in this embodiment, an activity is written only when an error/warning has occurred. However, the activity writing condition can be suitably designed, and the activity may be written in other cases.

Figure 5B:
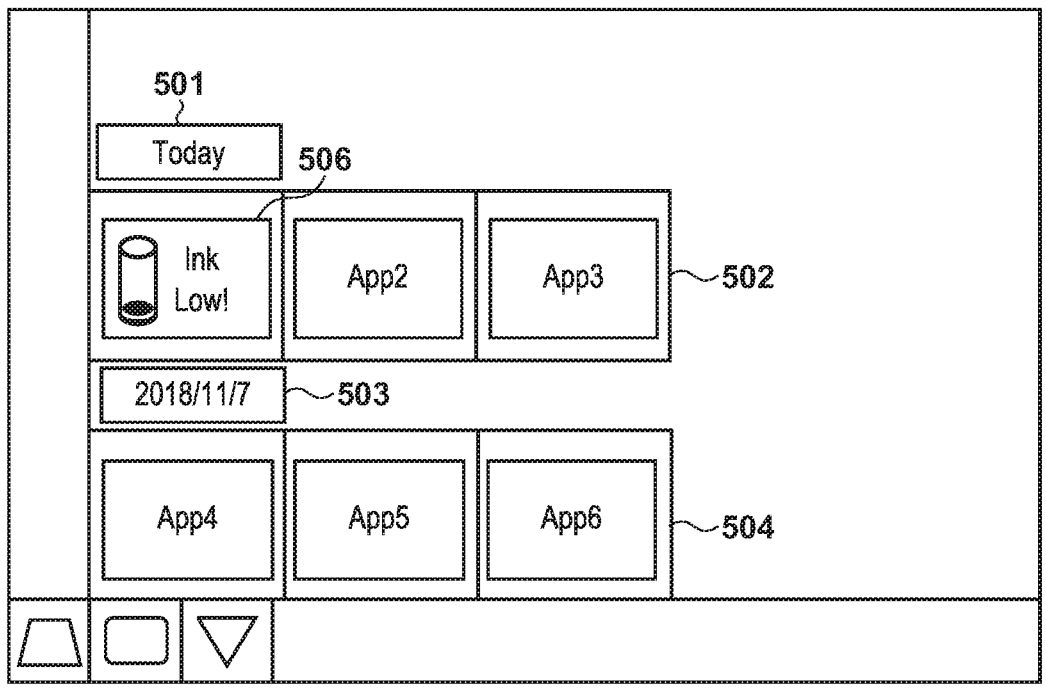
FIG. 5B is a view showing an example of the activity list displayed by the activity management unit on the desktop of the OS.

FIG. 5B shows an example in which the bitmap image as the display image of a tile 506 has been changed in accordance with an error that has occurred in the printer 230. The tile 506 is a display example of a case in which the "low ink" warning has occurred in the printer 230. In this manner, by changing the bitmap image to be displayed on the tile in accordance with each phenomenon such as the "low ink" warning, "out of sheets", "out of ink", and the like, the user can intuitively understand the type of the error/warning which has occurred in the printer.

As described above, by applying the system according to this embodiment, it is possible to display the tile 505 corresponding to the application 211 in the activity list of the OS in only a case in which an error or a warning has occurred in an information device such as a printer or the like. As a result, even after the application 211 has ended, the user can reactivate the application 211 from the tile 505. Hence, convenience improves because the user can reconfirm the information related to the error or the warning of the printer 230.

Also, in this embodiment, the application 211 selects whether to register the activity in accordance with the state of the printer 230. For example, the application 211 performs control so an activity will be registered in a case in which the printer is in a state considered to be of high importance (an error, a warning, or the like) to the user, and an activity will not be registered in a case in which the printer is in a state considered to be of lower importance (a normal state with no occurrence of an error or a warning) to the user than the aforementioned state. As a result, the OS can prompt the user to reactivate the application 211 by making a display as shown in FIGS. 5A and 5B when it is determined that the printer is in a state of high importance for the user. Furthermore, when the printer is in a state of comparatively low importance for the user, the OS can prevent unnecessary notification to the user by the display shown in FIGS. 5A and 5B.

Second Embodiment

A system according to the first embodiment employed a method in which an application 211 obtained management information from a printer 230 and registered an activity in the OS if an error/warning of the printer 230 was detected. This embodiment describes a system that determines the activation mode of the application 211 regardless of the state of the printer and switches whether to register the activity in the OS in accordance with the determined activation mode. In this embodiment, in a case in which the application 211 is activated by a printer driver 240 based on the printing operation of the printer 230, assume that an "activation mode: activation at printing" will be designated. Also, assume that an "activation mode: resident activation" will be designated when the application 211 is activated by another system. In the case of the "activation mode: activation at printing", the application 211 will automatically end upon detecting the end of the printing operation. In the case of the "activation mode: resident activation", the application 211 will end when the user makes an operation to end the application on the GUI of the application 211. Note that the basic operation of a printing system according to the second embodiment is similar to that of the first embodiment, and a description may be omitted in some cases. Differences from the operation of the first embodiment will be mainly described hereinafter.

Figure 6:
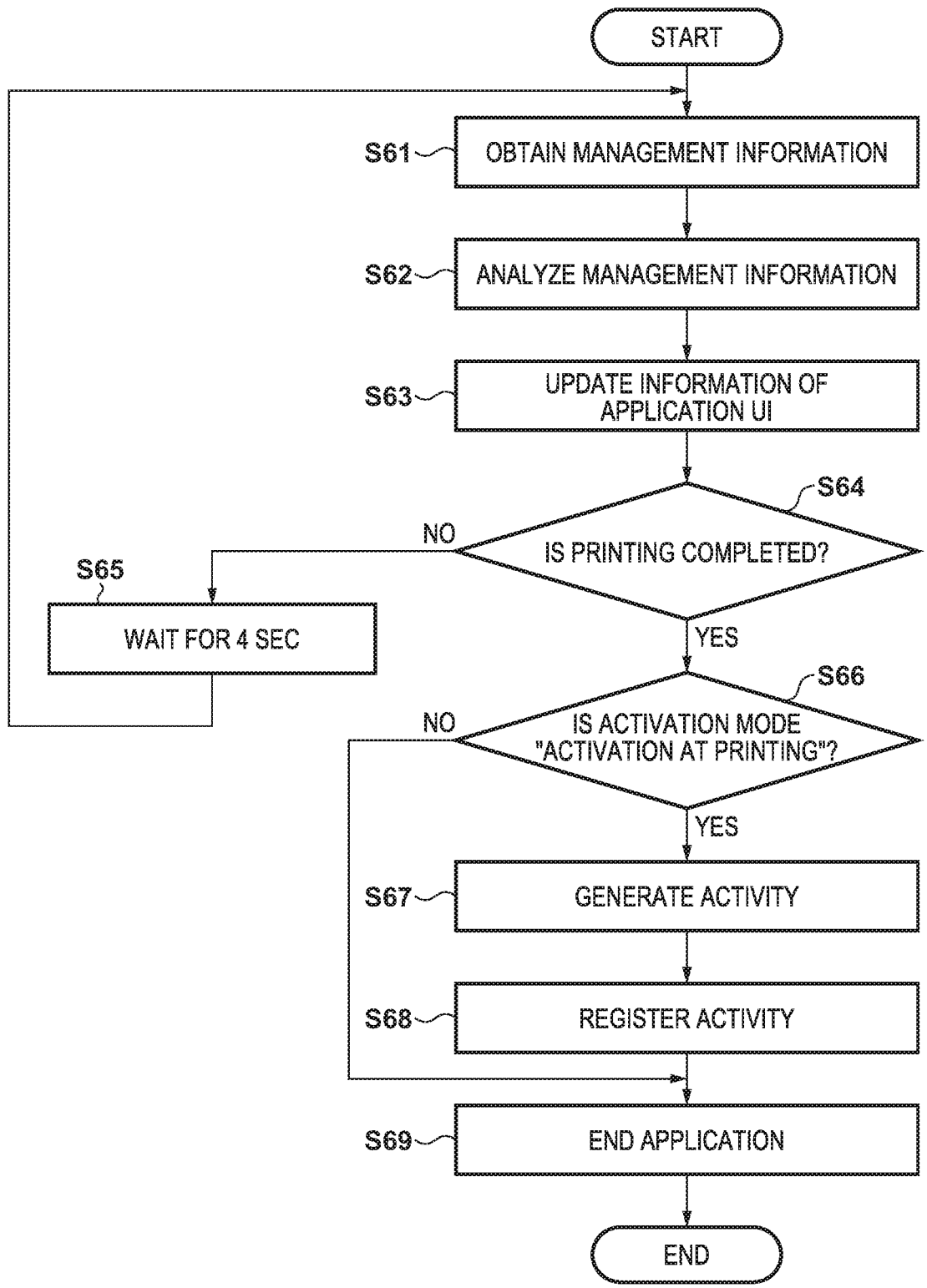
FIG. 6 is a flowchart of the processing procedure of an application activated by a printer driver at the time of printing according to the second embodiment.

FIG. 6 is a flowchart showing the processing procedure of the application 211 according to the second embodiment. When the application 211 is activated, in step S61, an obtaining unit 212 obtains management information from a management information holding unit 232 by communicating with the printer 230 via a network 220. The management information includes print job progression status information, remaining ink information, information of an error/warning that has occurred in the printer, and the like. In step S62, an analyzing unit 217 analyzes the management information to confirm the progression status of the printing operation, the remaining ink information, and whether an error or a warning has occurred in the printer.

In step S63, the application 211 performs a process similar to that of step S33. In step S64, a registration control unit 214 determines, based on the management information, whether a print job has been completed in the printer 230. If it is determined that the print job has been completed, the application 211 shifts to the process of step S66. If it is determined that the print job has not been completed, that is, the print job is being executed, the application 211 shifts to the process of step S65. Note that the process will shift to step S66 even in a case in which a job is not being executed in the printer 230 at the time of activation by resident activation.

In step S65, the registration control unit 214 waits for 4 sec. Since the management information will be periodically polled until the completion of the print job, the application shifts to the process of step S61, and the above-described processes are repeated.

In step S66, the registration control unit 214 determines, based on the activation mode of the application 211, whether to register the activity in the OS. If the activation mode of the application 211 is the "activation at printing", the registration control unit 214 will determine to register the activity in the OS. In this case, the application 211 will shift to the process of step S67. On the other hand, if the activation mode of the application 211 is "resident activation", the registration control unit 214 will determine not to register the activity in the OS. In this case, the application 211 shifts to the process of step S68. The confirmation of the activation mode of the application is performed by, for example, confirming a command line argument of the process of the application 211. As an example, it may be set so that "MODE:1" will be transferred as the command line argument in the case in which the activation mode is the "activation at printing", and "MODE:0" will be transferred as the command line argument in the case in which the activation mode is the "resident activation".

In steps S67 to S69, the application 211 executes processes similar to those of steps S37 to S39. Subsequently, the process of the application 211 ends.

This embodiment shows an example in which the activation mode of the application 211 is determined so that the activity will be registered in the OS in a case in which the application 211 has been activated in link to a printing operation. However, it may be set so that the activity will be registered in the OS based on another piece of information. For example, a determination may be made based on information such as the application name, the document name, and the like used in the printing operation. As a result, it is possible to display, based on information other than the state of the printer itself, for example, information of a PC 210, a tile 505 corresponding to the application 211 on the activity list of the OS by limiting the display to only cases in which the user is necessary.

As described above, by applying the system according to the second embodiment, it is possible to display the tile 505 corresponding to the application 211 on the activity list of the OS in only a case in which the application 211 has been activated simultaneously with the start of a printing operation. As a result, in a case in which the user wants to confirm the state of the printer after the printing operation has been executed, the user can click the tile 505 to activate the application 211 and confirm the state of the printer even if the process of the application 211 has already ended.

In addition, as a mode of activity display by an activity management unit 250 of the OS, it is possible to consider a mode of prioritizing and displaying a piece of information with the latest registration date when the activity list is to be displayed on the desktop of OS. In this case, applying the mechanism of this embodiment has an effect that the tile 505 corresponding to the application 211 can be displayed as the latest item in the activity list when the user executes a printing operation. In addition, it is possible to employ an arrangement obtained by combining the arrangement of the first embodiment and the arrangement of the second embodiment. For example, it is possible to employ an arrangement in which an activity is registered in the OS in a case in which the application 211 has been activated in link with a printing operation and an error/warning or the like has occurred in the printer 230, and an activity is not registered in other cases.

Third Embodiment

The third embodiment will describe a system which includes the following arrangement in addition to a system described in the first embodiment. That is, a system that can register an appropriate activity even in a case in which an error/warning different from an error/warning, which occurred when an application 211 was previously activated in an information device such as a printer or the like, has occurred or a case in which the occurred error has been canceled. Note that the basic operation of a printing system according to the third embodiment is similar to that of the first embodiment, and a description may be omitted in some cases. Differences from the operation of the first embodiment will be mainly described hereinafter.

Figure 7:
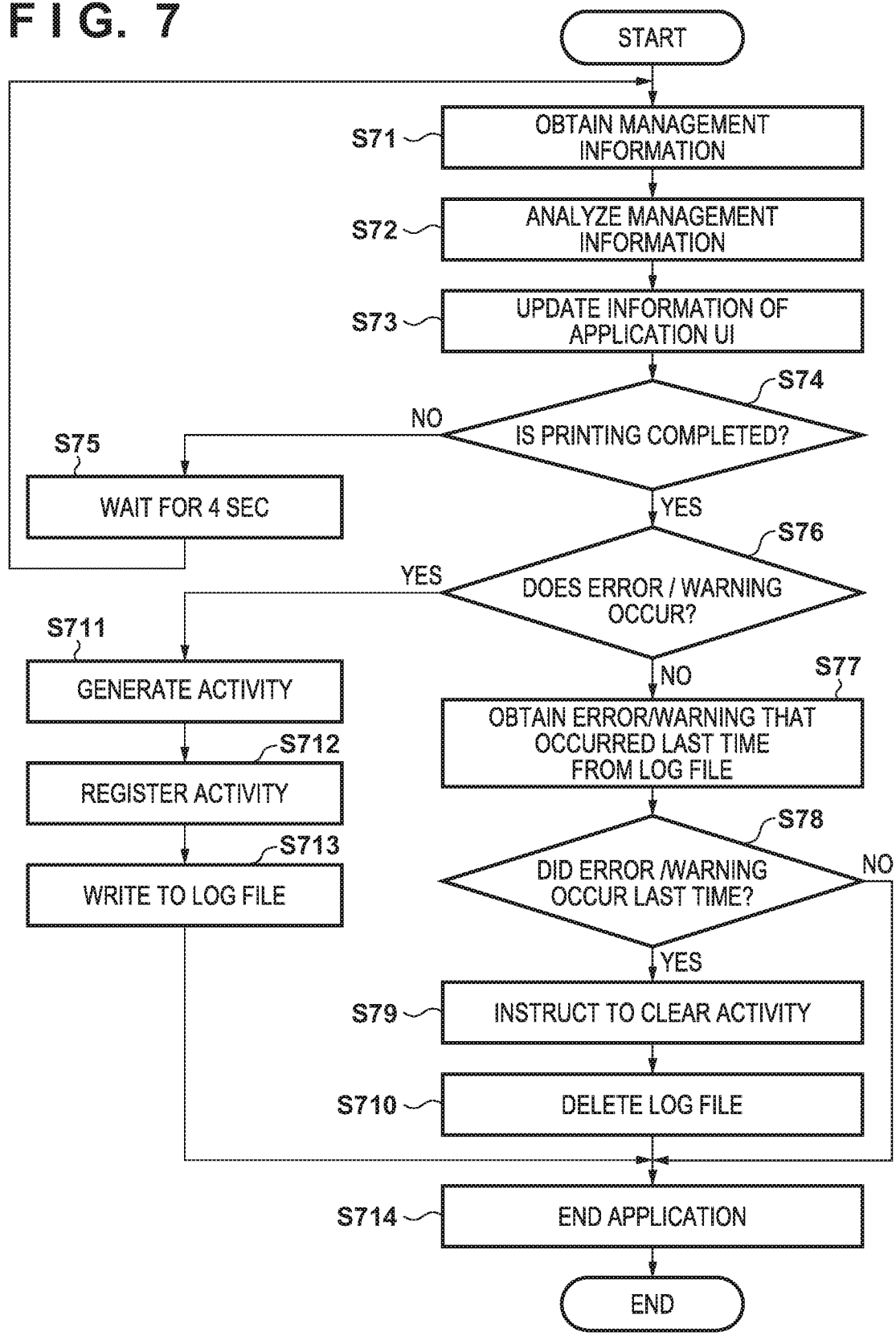
FIG. 7 is a flowchart of the processing procedure of an application activated by a printer driver according to the third embodiment.

FIG. 7 is a flowchart showing the processing procedure of the application 211 activated by a printer driver 240 at the time of a printing operation according to the third embodiment. The processing of this flowchart starts when the application 211 is activated. The processes of steps S71 to S75 are similar to the processes of steps S31 to S35.

In step S76, a registration control unit 214 determines whether to register an activity in the OS based on the obtained and analyzed management information. The registration control unit 214 will determine to register the activity in the OS when a phenomenon requiring user notification has occurred in the printer 230 and will determine not to register the activity when such a phenomenon has not occurred. A phenomenon that requires user notification is, for example, a "no ink" error, a "low ink" warning, a "no paper" error, or the like. If the registration control unit 214 determines to register the activity in the OS, the application 211 shifts to the process of step S711. On the other hand, if the registration control unit 214 determines not to register the activity in the OS, the application 211 shifts to the process of step S77.

In step S77, the registration control unit 214 refers to a log file of the application 211 and obtains what kind of an error/warning occurred in the printer 230 when the application 211 was previously activated. In this embodiment, a log file is information in which the kind of the occurred error/warning has been written together with the activity to preserve this information as a log when a registration unit 216 is to write the activity in the OS. Note that the registration control unit 214 will handle a case in which a log file is absent as a case in which an error/warning has not occurred in the printer 230 when the application 211 was previously activated.

In step S78, the registration control unit 214 determines, based on the information obtained from the log file in step S77, whether an error/warning requiring user notification occurred in the printer 230 when the application 211 was previously activated. If the registration control unit 214 determines that an error/warning requiring user notification occurred in the printer 230 when the application 211 was previously activated, the process shifts to step S79. If the registration control unit 214 determines that an error/warning requiring user notification did not occur in the printer 230 when the application 211 was previously activated, the process shifts to step S713.

In step S79, the registration unit 216 issues, to an activity management unit 250 of the OS, an instruction to clear the activity of the application 211. When a clear instruction is issued, the OS clears the activity corresponding to the application 211 displayed as a tile 505 in the activity display area 502. Although the activity is cleared immediately before the end of the application 211 in the processing according to this embodiment, the clearing of the activity may be performed at another timing. For example, the clearing of the activity may be performed at the timing when the cancellation of the error/warning which occurred in the printer 230 has been determined after the activation of the application 211. Subsequently, in step S710, the registration unit 216 deletes the log file.

In steps S711 and S712, the application 211 performs processes similar to those of steps S37 and S38. A generating unit 215 generates an activity.

In step S713, the registration unit 216 writes the information related to the error/warning which occurred in the printer 230 as a log file. Subsequently, in step S714, the application 211 ends the processing, and the process of the application 211 ends.

The third embodiment has an arrangement in which the application 211 obtains a log file that indicates the type of an error/warning which occurred when the application 211 was previously activated. However, the present arrangement is merely an example, and information of the occurrence of an error/warning may be obtained from the activity corresponding to the application 211 via, for example, an API (Application Programming Interface) of the OS.

As described above, by applying the system according to the third embodiment, it is possible to re-register an activity corresponding to the latest error/warning in a case in which an error/warning different from that which occurred when the application 211 was previously activated has occurred. In addition, in a case in which the occurred error/warning has been canceled, the activity corresponding to the application 211 is cleared from the activity display area 502. As a result, it becomes possible to prevent the application 211 from being activated unnecessarily even though the information to be notified by the application 211 has disappeared. Note that the first embodiment to the third embodiment can be combined appropriately.

Fourth Embodiment

This embodiment will describe a system that changes the processing after the activation of an application 211 in accordance with the contents of a log file in a case in which the application 211 has been activated by clicking a tile 505 in an activity display area 502. This embodiment will describe an example in which a display operation to prompt a user to purchase ink is performed in a case in which an error/warning related to ink had occurred when the application was previously activated, and an operation to display a GUI similar to that shown in FIG. 4 in the first embodiment to the third embodiment is performed in other cases. Note that the basic operation of a printing system according to the fourth embodiment is similar to that of the first embodiment, and a description may be omitted in some cases. Differences from the first embodiment will be mainly described hereinafter.

Figure 8:
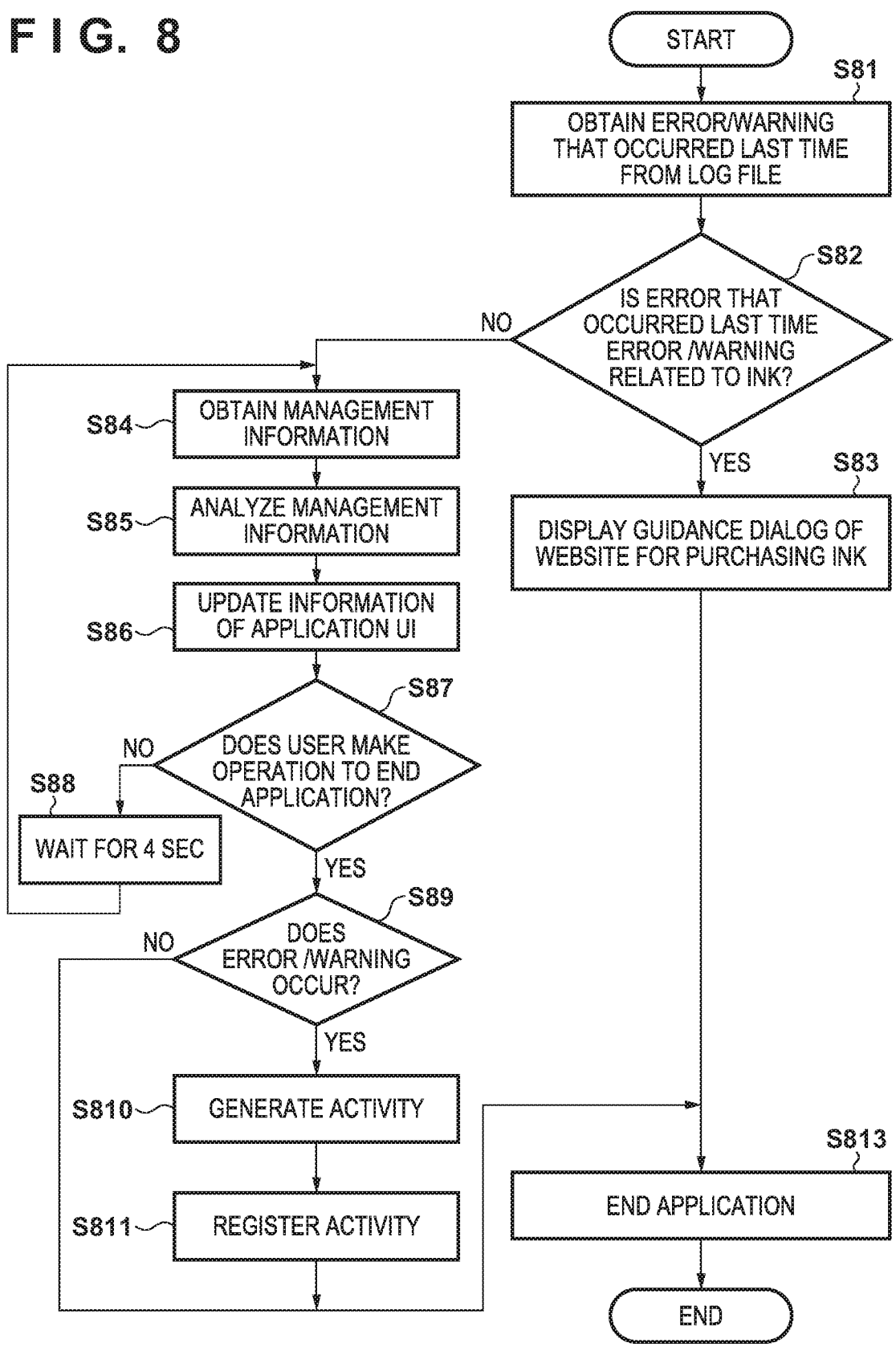
FIG. 8 is a flowchart of the processing procedure of an application activated by clicking a tile in an activity display area according to the fourth embodiment.

FIG. 8 is a flowchart showing the processing procedure of the application 211 in a case in which the application has been activated by clicking the tile 505 in the activity display area 502 according to the fourth embodiment. The processing procedure is started when the application 211 is activated by the clicking of the tile 505.

First, in step S81, a registration control unit 214 refers to a log file of the application 211 to obtain information indicating the type of error/warning which occurred in a printer 230 when the application 211 was previously activated.

In step S82, the registration control unit 214 determines whether the error that occurred in the printer 230 when the application 211 was previously activated is an error/warning related to ink. If the error that occurred in the printer 230 when the application 211 was previously activated is an error/warning related to ink, the process shifts to step S83. Otherwise, the process shifts to step S84.

In step S83, the application 211 displays a guidance dialog of an online store. Details of a display example of a GUI of a website for purchasing ink will be described later with reference to FIG. 9. In the guidance dialog of the online store for purchasing ink, the application 211 activates the default browser of the OS when a "go to the online store" button 903 is pressed. The application 211 displays the page of the online store, provided by the printer vendor, on the browser. The application 211 also stops displaying the guidance dialog of the online store. The display of the guidance dialog of the online store is ended without any operation when a cancel button 904 is pressed.

Steps S84 to S86 perform processes similar to those of steps S31 to S33. In addition, in step S87, the registration control unit 214 determines whether the user has made an operation to end the application on the GUI of the application 211. If the registration control unit 214 determines that the user has made an operation to end the application on the GUI of the application 211, the application shifts to the process of step S89. On the other hand, if the registration control unit 214 determines that the user has not made an operation to end the application on the GUI of the application 211, the application 211 shifts to the process of step S88.

If the process has shifted from step S87 to step S88, the application 211 waits for 4 sec in step S88. In order to periodically poll the management information until the user makes an operation to end the application on the application 211, the process returns to step S86. On the other hand, if the process has shifted from step S87 to step S89, processes similar to those of steps S36 to S38 are performed in steps S89 to S811. In step S812, the application 211 ends the processing, and the process of application 211 ends.

Figure 9:
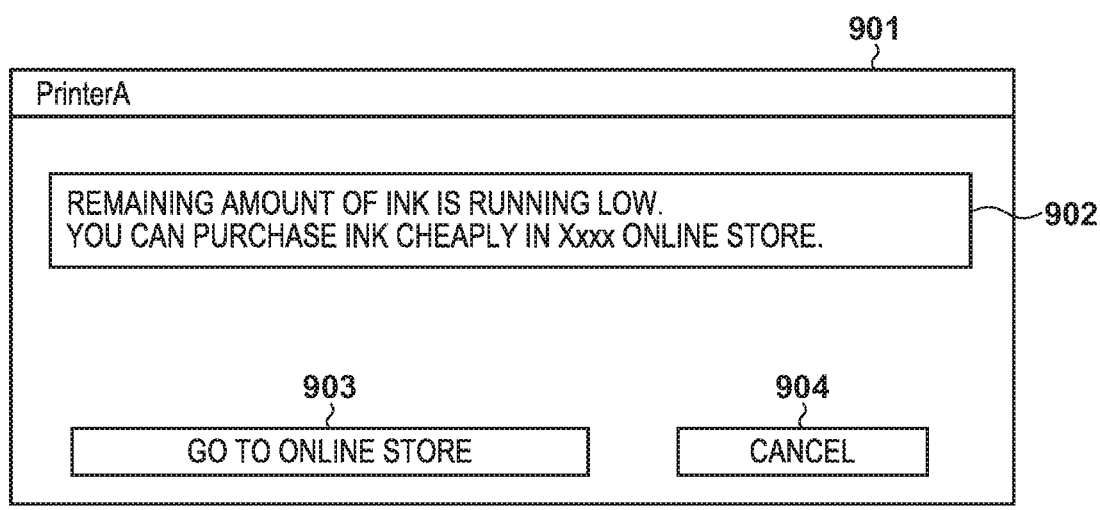
FIG. 9 is a view showing a display example of a guidance dialog of an online store displayed by the application according to the fourth embodiment.

FIG. 9 shows a display example of the guidance dialog of the online store displayed by the application 211 according to the fourth embodiment. A title bar 901 displays the name of the printer 230. Upon notifying the user that the ink is running low, text edit control 902 displays a message or the like to guide the user to the online store provided by the vendor. When the "go to the online store" button 903 is pressed, the default browser is activated, the page of the online store provided by the vendor is displayed on the browser, and the display of the guidance dialog of the online store ends. Although the fourth embodiment described an example in which the guidance dialog of an online store is displayed when the tile 505 is clicked in the activity display area 502, it may be arranged so that the browser will be activated and the page of the online store will be displayed without displaying the guidance dialog of the online store.

Although the fourth embodiment described an example in which the tile 505 is clicked at the time of the occurrence of an error/warning related to ink, processing of the application 211 which is different from the normal processing may be performed when an error/warning has occurred for another consumable product. For example, in a case in which one of other errors and warnings such as a "no paper" error, a "cover open" error, and the like has occurred, the application 211 may execute processing so that the default browser of the OS will be activated and the page of an online manual corresponding to the error will be opened.

In addition, the system according to this embodiment is not limited to a case in which an error/warning has occurred in the printer 230, and the post-activation processing of the application 211 may be changed in accordance with a log file when another phenomenon which the user needs to be notified of has occurred. For example, in a case in which a new version of the application 211 has been uploaded on the Web, the application 211 may activate the default browser of the OS and display the page on which the latest version of the application 211 has been uploaded.

As described above, the system according to the fourth embodiment allows the post-activation processing of the application 211 to be changed in accordance with the log file when the application 211 has been activated by clicking the tile 505 in the activity display area 502. Hence, the user can be guided more intuitively to a solution for the error/warning that has occurred in the printer 230.

Other Embodiments

The basic arrangement of the present invention is not limited to those described above. The above embodiments are merely a means for obtaining an effect of the present invention, and can be incorporated in the scope of the present invention even if a similar but different method or a different parameter is used, as long as the same effect as the present invention is obtained. Although an example of a management information display program of an image processing apparatus has been described in the above embodiments, the present invention is not limited to this.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-015985, filed Jan. 31, 2019, which is hereby incorporated by reference herein in its entirety.

What is claimed is:

1. A non-transitory computer-readable storage medium storing a predetermined application that, when executed by at least one processor, causes an information processing apparatus to:
obtain information related to a printer communicating with the information processing apparatus, and
determine whether a predetermined condition is satisfied, wherein, based on a determination result that the predetermined condition is satisfied, activity information of the predetermined application is registered in the operating system (OS), whereby an item related to the predetermined application is able to be displayed by the OS based on the activity information even after the predetermined application has terminated, and
wherein, in a case where a user instruction is performed on the displayed item related to the predetermined application, the predetermined application is newly activated in response to the user instruction, and the predetermined application causes a message based on the information related to the printer to be displayed.

2. The medium according to claim 1, wherein the predetermined application, when executed by the at least one processor, causes the information processing apparatus to generate the activity information based on the predetermined information and wherein the displayed item related to the predetermined application includes an image based on the predetermined information.

3. The medium according to claim 1, wherein the predetermined information is information about a predetermined error or a predetermined warning that occurred in the printer.

4. The medium according to claim 1, wherein the predetermined application is activated based on outputting a print job by a printer driver, and
wherein, in a case where the obtained information related to the printer satisfies the predetermined condition, the predetermined application causes the OS to register the activity information, and in a case where the obtained information related to the printer does not satisfy the predetermined condition, the predetermined application does not cause the OS to register the activity information.

5. The medium according to claim 1, wherein the information related to the printer is newly obtained after the activity information is registered in the operating system, and in a case where the newly obtained information related to the printer does not satisfy the predetermined condition, the predetermined application causes the OS to delete the activity information registered in the OS.

6. The medium according to claim 1, wherein the predetermined application performs control to cause a display unit to display a display image corresponding to contents of the activity.

7. The medium according to claim 1, wherein the at least one processor can activate the predetermined application based on a user instruction for selecting the item displayed on a display unit.

8. An information processing apparatus comprising:
at least one processor, and
at least one memory storing a predetermined application that, when executed by the at least one processor, causes the information processing apparatus to:
obtain information related to a printer communicating with the information processing apparatus, and
determine whether a predetermined condition is satisfied,
wherein, based on a determination result that the predetermined condition is satisfied, activity information of the predetermined application is registered in the operating system (OS), whereby an item related to the predetermined application is able to be displayed by the OS based on the activity information even after the predetermined application has terminated, and
wherein, in a case where a user instruction is performed on the displayed item related to the predetermined application, the predetermined application is newly activated in response to the user instruction, and the predetermined application causes a message based on the information related to the printer to be displayed.

9. An information processing method executed in an information processing apparatus, the method comprising:
obtaining information related to a printer communicating with the information processing apparatus, and
determining whether a predetermined condition is satisfied,
wherein, based on a determination result that the predetermined condition is satisfied, activity information of the predetermined application is registered in the operating system (OS), whereby an item related to the predetermined application is able to be displayed by the OS based on the activity information even after the predetermined application has terminated, and
wherein, in a case where a user instruction is performed on the displayed item related to the predetermined application, the predetermined application is newly activated in response to the user instruction, and the predetermined application causes a message based on the information related to the printer to be displayed.

10. The method according to claim 9, the method further comprising:
generating the activity information based on the predetermined information,
wherein the displayed item related to the predetermined information includes an image based on the predetermined information.

11. The method according to claim 9, wherein the wherein the predetermined information is information about a predetermined error or a predetermined warning that occurred in the printer.

12. The method according to claim 9, wherein the predetermined application is activated based on outputting a print job by a printer driver, and
wherein, in a case where the obtained information related to the printer satisfies the predetermined condition, the predetermined application causes the OS to register the activity information, and in a case where the obtained information related to the printer does not satisfy the predetermined condition, the predetermined application does not cause the OS to register the activity information.

13. The method according to claim 9, wherein the information related to the printer is newly obtained after the activity information is registered in the operating system, and in a case where the newly obtained information related to the printer does not satisfy the predetermined condition, the predetermined application causes the OS to delete the activity information registered in the OS.

14. The method according to claim 9, wherein the predetermined application performs control to cause a display unit to display a display image corresponding to contents of the activity.

15. The method according to claim 9, wherein the information processing apparatus can activate the predetermined application based on a user instruction for selecting the item displayed on a display unit.

* * * * *